May 13, 1958  R. A. WELLS  2,834,491
BOAT LOADER AND CARRIER
Filed Feb. 6, 1956  2 Sheets-Sheet 1
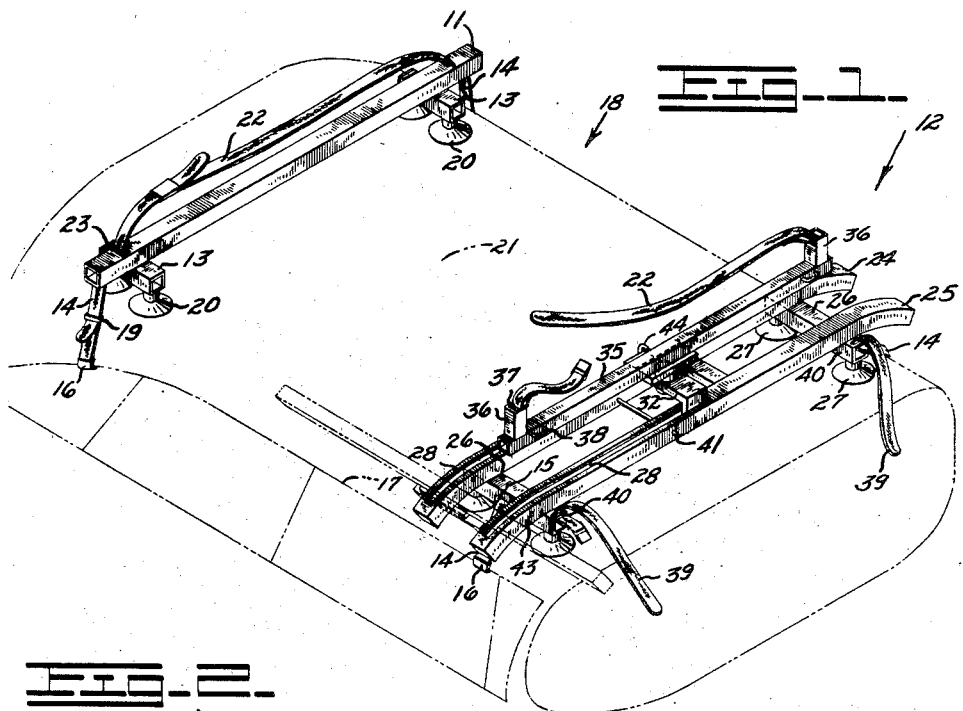
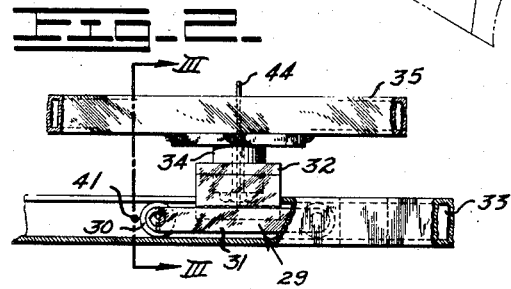
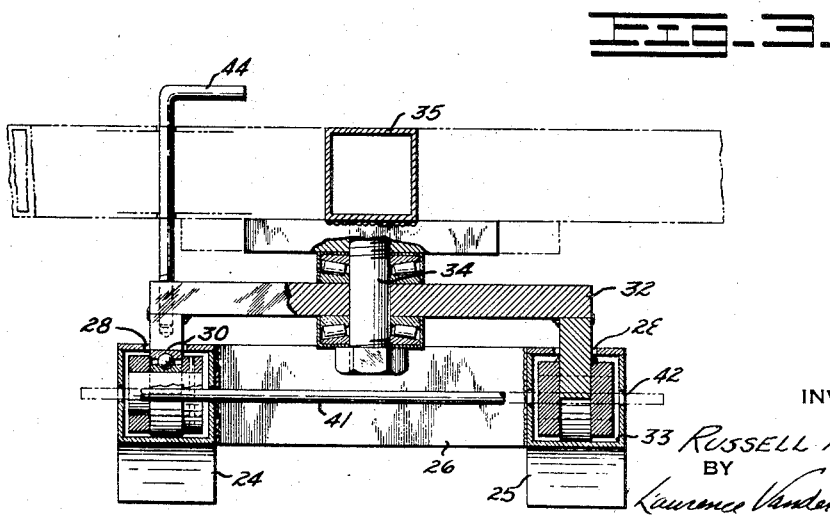
INVENTOR
*Russell A. Wells*
BY
*Lawrence VanderKelen & Miller*
ATTORNEYS

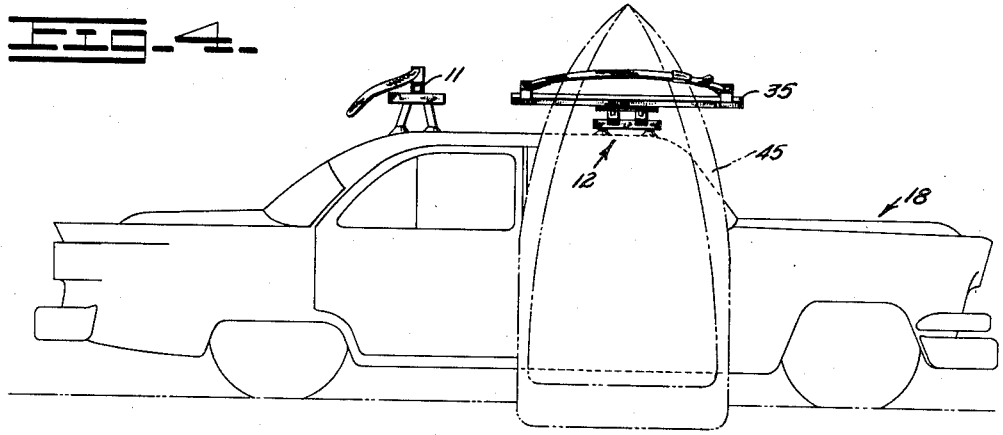
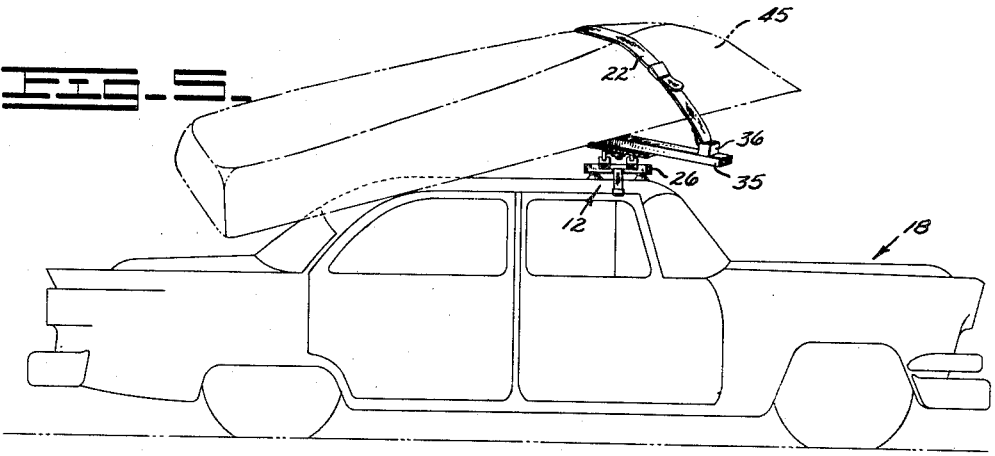
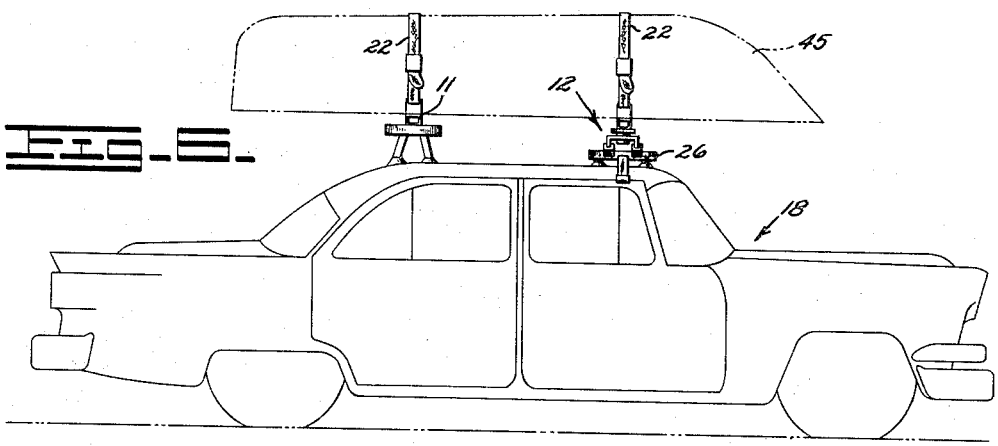
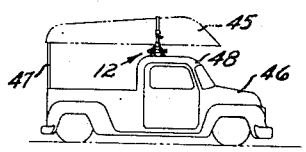
INVENTOR
RUSSELL A. WELLS
BY
Lawrence VanderKelen & Weller
ATTORNEYS United States Patent Office 2,834,491
Patented May 13, 1958

2,834,491

BOAT LOADER AND CARRIER

Russell A. Wells, St. Johns, Mich.

Application February 6, 1956, Serial No. 563,462

5 Claims. (Cl. 214—450)

This invention relates to racks or support frames known as boat loaders and carriers, and more particularly to a vehicle top carrier and loading device which is rotatable and traversable so that a boat or similar cumbersome object may be loaded on top of an automobile by one man with a minimum of effort.

To meet the great demand for a method of easily transporting boats occasioned by the increase of people participating in fishing, boating, and other water sports, many types of vehicle top carriers has been designed. These carriers have also been used to carry ladders, skis, toboggans and other similarly shaped cumbersome objects used in various activities. Attempts have been made to enhance the utility of these carriers by incorporating a loading device into the carrier or support frame. These devices have sought to facilitate the loading of the boat to a position above the automobile for safe transport to a desired location and provide for ease in unloading at the destination. The ultimate goal has been a loading device and carrier capable of being operated by one person, but as yet this goal of one man operation has not been reached. These devices have included the provision of rollers on the rear portion of a car top carrier whereby the boat or similar object is loaded from the rear of the automobile. Not only is this unsatisfactory because of the elongated trunk design of modern automobiles, but the rear roller-type device precludes effectively using a pick-up truck for example, as a prime mover. Other devices provide for loading from the side of the vehicle. These devices have included the provision of a single support frame with a pivotal loading bar. The loading bar in this type device works in cooperation with an arcuate track fixedly joining the front and rear portions of the single frame carrier. The pivotal point of such a loading device is a forward corner of a rectangular frame. In its loaded position, the loading bar transversely straddles the automobile top. For loading, the free end of the loading bar is pivoted, following an arcuate track, until it is parallel to the longitudinal axis of the automobile and is near but not at the edge of the automobile top. Due to the use of a single support frame, there must be considerable pushing, lifting and shoving before the boat has achieved a balanced loaded position and can be secured. The single frame incorporating front and rear support members is not flexible and cannot take advantage of additional roof space provided by a longer automobile. This problem has become increasingly important in recent years due to the fact that more families have at least two cars at their disposal. The single frame carrier would require a different carrier for each size car. Again, the use of a pick-up truck is precluded. Another difficulty with such devices is that the pivotal bar can only be rotated in a horizontal plane. Therefore, after the front of the boat has been placed against the loading bar, the rear end of the boat must be raised to a horizontal position before it can be rotated onto the vehicle top. In some known devices where a pivotal bar is employed the loading must be carefully accomplished to avoid damage to the automobile body because the pivotal bar in its loading position does not clear the side of the car. The loading is further complicated because the loading bar remains in the same high horizontal plane above the car while in the loading position. These limitations have made it necessary to have at least two men loading or unloading a cumbersome object from an automobile top.

It is therefore an object of this invention to provide a loading device in association with a car top carrier that will enable one man to load or unload cumbersome objects from a vehicle.

A further object of this invention is to provide a flexible boat loader and carrier that can be used on any size automobile or pick-up truck because the loading device is associated only with the separate front support frame of the carrier.

A still further object of this invention is to provide a boat loader and carrier whose loading arm, during loading and unloading, can be traversed in such a manner as to follow the top contour of the automobile to a position clear of the edge of the car top and thereby bringing the arm nearer to the ground, and then the arm can be rotated on a shifted axis providing greater utility in handling bulky and cumbersome objects and loads.

Another object is to provide a simple trouble-free structure capable of high production and economical maintenance.

Other objects and advantages found in the construction of my invention will be apparent from a consideration of the following specification in connection with the appended claims and the accompanying drawings.

In the drawings:

Figure 1 is a perspective view of the novel boat loader and carrier with the rear support bar and front support frame in position above an automobile top showing the loading bar and carriage in their central carrying position and illustrating by dotted lines the loading bar in its traversed and swiveled loading position.

Figure 2 is an enlarged fragmentary side elevation view of the carriage locked in its loaded or carrying position relative to the front support frame and further showing the loading bar locked in its loaded or carrying position relative to the carriage.

Figure 3 is an enlarged fragmentary sectional view taken on lines III—III of Figure 2 showing the carriage locked in its central position by action of the horizontal lock pin against the carriage rollers contained in the track created by the hollow bars of the front support frame and illustrating by dotted lines the swiveled loading arm locked in its loading position by the vertical loading bar lock pin.

Figure 4 is a side elevation view of the automobile, the rear support member, the front support frame with the loading bar in its swiveled and traversed loading position, and illustrating by dotted lines the boat to be loaded standing on its rear end and resting against and secured to the overhanging loading bar.

Figure 5 is a side elevation view of the automobile, the front support frame with the loading bar in its traversed position partially swiveled, and illustrating by dotted lines the position of the boat while the rear end is being simultaneously lifted and rotated toward its loaded position over the rear portion of the automobile.

Figure 6 is a side elevation view of the automobile, the rear support bar, the front support frame with the loading bar and carriage in their central loaded positions, and illustrating by dotted lines the boat secured above the car in balanced loaded position by use of securing straps attached to the rear support bar and the loading bar.

Figure 7 is a side elevation view of a modification of this invention using a pick-up truck as a prime mover with the front support frame positioned above the cab of the truck, and illustrating by dotted lines the boat in its loaded position having its rear end supported by a rear support extension or yoke.

*General description*

In general a fixed rear support member is provided which transversely straddles an automobile top. Provision is made in the rear support member for securing objects thereto. The rear support is removable and is selectively positioned on an automobile top. Where a pick-up truck or other cab type vehicle is used the rear support member may be eliminated and a conventional or modified yoke can be employed. The front support frame comprises a pair of members spaced apart from each other and downturned at the ends to follow generally the contours of the vehicle top. Suction cup mountings protectively cushion the frame in a selected position on the vehicle top. The elongate downwardly curved members comprise guides. The guides provide a track along which a carriage may travel. The carriage is provided with an upstanding spindle located generally near the center of the carriage and in a vertical position when the carriage is centered on the automobile top. As the carriage moves to follow the contours established by the downturned frame members the axis of the spindle shifts from vertical to approach horizontal as the carriage reaches its extreme travel near the edge of the automobile. A loading bar is pivotal upon the axis established by the spindle, and moves with the carriage on the elongate contour-following members or tracks. In the extreme edge position of the carriage the loading bar thus is made to overhang the automobile top to form a ledge against which a boat may be leaned and to which the boat is secured, thereby protecting the side of the automobile. Once the boat is secured the carriage is easily moved upwardly and inwardly toward the centered travel position. As this movement occurs the position of the rear of the boat can be simultaneously raised and rotated to rest finally upon the fixed rear support. Locks are provided for the carriage in its extreme positions which secure the carriage against chance movement. Locks also secure the loading bar in the extreme positions against shifting and rotation. Securing straps are provided to hold the load to the loading bar and the loading bar to the frame in traveling position.

Thus, a novel and highly utilitarian car top loader has been provided requiring a minimum of inconvenience to the sportsman or user. It will further be seen as the description becomes more specific that the dual action of a traveling carriage and swiveling loader bar makes possible this new concept in loading devices. Further, utility is achieved by limiting the operation of the swivel loading device entirely to the front support member, thereby enabling the separate rear support bar to be flexibly positionable so as to utilize all available car-top space and permit use on a pick-up truck, if necessary.

*Specific description*

The boat loader and carrier as shown in Figure 1 has two separate components, a rear support bar 11 and a front support frame 12. These components are preferably constructed from hollow bars of fabricated steel. Rear cross bars 13 are welded beneath and near each end of the rear support bar 11. The rear support bar 11 is held in position by positioning straps 14 attached by use of brackets 15 to the bottom side of the bar 11 near each end. These straps may also be passed through slots provided in the rear support bar. The positioning straps 14 are provided with clamps 16 that hook tightly under the eavestrough beading 17 of an automobile 18 and buckles 19 are provided to tighten these straps. As shown in Figure 1, the rear cross bars 13 are provided with suction cup feet 20 that extend downwardly from the bottom surface of the rear cross bars and provide positive support without damaging the car top 21. The upper surface of the rear support bar 11 is provided with load retaining or restraining straps 22 attached at each end through brackets 23 in the upper surface of the rear support bar 11. Again, slots may be provided instead of brackets.

The front support frame 12 comprises two parallel spaced apart elongate support bars 24 and 25. They are fixedly joined near each end by front cross bars 26 similar to the rear cross bars 13 of the rear support bar 11 and are also provided with downwardly extending suction cup feet 27. The support bars 24 and 25 of the front support frame 12 are made preferably from hollow fabricated metal and are downwardly curved at each end to transversely follow the contour of the vehicle top 21. Positioning straps 14 are attached to the bottom surface of each front cross bar 26 by use of brackets or slots 15 and are provided with clamps 16 that engage the eavestrough beading 17 of the automobile 18 as shown in Figure 1. Each elongate support bar 24 and 25 of the front support frame 12 has an access opening 28 in its top face and contained in each member 24 and 25 is a movable roller assembly 29 consisting of rollers 30 and a connecting plate 31. The roller assemblies are fixedly joined to form a movable carriage 32 as best shown in Figure 3 that moves along a track 33 created by the hollow bars 24 and 25.

An upwardly disposed vertical spindle 34 is centrally mounted on the carriage 32 and a loading bar 35 is swively positioned on said spindle 34. An upwardly disposed vertical load retaining guard 36 is welded to the top face at each end of the loading bar 35 and provided with a slot 37 through which a load retaining strap 22 provided with a tightening buckle 19 is attached. A load stabilizing bracket 38 horizontally disposed is also welded to the front face at each end of the loading bar 35. Stabilizing straps 39 provided with tightening buckles 19 engage the brackets 38 and pass through slots 40 provided in the front cross bars 26 to secure the loading bar 35 in the loaded position or when it is not being used.

In the carrying or loaded position of the carrier as shown in Figure 1, the loading bar 35 is parallel to the elongate contour following bars 24 and 25 of the front support frame 12. The carriage 32 is locked in its central position (Figure 1) above the vehicle 18 by a carriage lock pin 41 passed through the center lock pin holes 42 provided in the front support bars 24 and 25. The carriage 32 is secured by the carriage lock pin 41 on one side and the inner end of access opening 28 on the other side as shown in Figure 2.

For loading or unloading, the carriage lock pin 41 is removed and the carriage 32 is transversely moved toward the outer edge of the elongate front support bars 24 and 25. By so doing, the carriage 32 enters the downwardly curved portion of the elongate front support bars 24 and 25. The carriage 32 is locked in the loading or unloading position by placing the carriage lock pin 41 in the outer lock pin holes 43. The carriage 32 is thus secured between the outer edge of the access opening 28 and the carriage lock pin 41 in the outer lock pin holes 43. The loading bar 35 is then rotated 90° to a position parallel to the longitudinal axis of the vehicle, as shown by the phantom drawing in Figure 2, and secured by a loading bar lock pin 44 locking the loading bar 35 to the carriage 32 as shown in Figure 3. In this position the loading bar 35 is nearer to the ground, overhangs the vehicle, and can be swiveled in a plane tangential to the edge of the automobile top 21. In this manner, loading is greatly facilitated because of the lower relationship the loading bar 35 has to the ground and more directly because the boat 45 or load can be swiveled to the loaded position while also lifting the rear of the boat 45. This is made possible by the rotation of the loading bar 35 in the tangential plane as shown in Figure 5.

Figures 4, 5, and 6 illustrate the loading sequence by showing the relative positions of the boat 45, car 21, front support frame 12 loading bar 35, rear support bar 11, and load retaining or restraining straps 22 during loading that utilizes the transversable and swivelable features of the applicant's device.

In order that the front support frame 12 be adaptable to any width automobile roof, the front support frame 12 can be modified to have the front cross bars 26 adjustable, thus moving the suction cup feet 27 to any desired position on the edge of the car top 21. This can be accomplished by welding four angle irons to the front support bars 24 and 25. Two angle irons are welded to the front face of the forward elongate front support bar 25 of the front support frame 12 and each disposed on the curved portions of the front support elongate bars 24 and 25. The remaining two angle irons are welded in similar positions on the rear face of the rear elongate bar 24 of the front support frame 12. The angle irons are about 6" in length and have faces of about 2" in width. These dimensions are not critical and are only used as examples. The exposed horizontal face is provided with several holes capable of receiving a bolt that would engage the front cross bar 26 below it. By varying the holes through which the bolt is placed, the distance between the cross bars 26 could be varied to correspond with the width of the automobile top 21 being utilized. This modification is not illustrated but believed to here be clear.

If desired, the structure of the carriage may be altered by providing the loading bar with a downwardly disposed spindle that is engaged by a centrally located hole in the carriage. The principle of operation would remain the same.

Another modification is illustrated in Figure 7 whereby the boat carrier is modified for use on a pick-up truck 46. The rear support bar is replaced by a vertical support yoke or frame 47 on the rear of the truck 46 which is of sufficient height to be in the same horizontal plane as the loading bar 35 of the front support frame 12 mounted on the cab 48 of the truck 46. Attached to the yoke 47 are load retaining straps for securing the rear end of a boat 45 or load placed on it.

Operation

In operation, the boat loader and carrier is placed in position by securely positioning the front support frame 12 on the forward portion of the automobile top 21. The rear support bar 11 is placed on the rear part of the roof and positioned in relation to the front support frame 12 so that the entire roof area is utilized, thus giving the loaded boat 45 greater stability. When use on a pick-up truck 46 is contemplated, the front support frame 12 is placed on the cab 48 of the truck 46 and, as shown in Figure 7, a vertical support yoke 47 extends above the rear of the truck so that its supporting surface is approximately in the same horizontal plane as the loading bar 35.

For loading, the carriage lock pin 41 is removed from the center lock pin holes 42 and the carriage 32 is moved to the edge of the automobile top 21 into the downwardly extending portion of the front support bars 24 and 25. The carriage lock pin 41 is inserted in the outer lock pin holes 43 and the carriage 32 is thus locked in the loading position. The loading bar lock pin 44 is removed and the loading bar 35 is rotated 90° until it is parallel to the longitudinal axis of the car and then is locked into loading position by engaging the loading bar lock pin 44. As shown in Figure 4, the boat 45 to be loaded is stood on its rear end with the inside of the boat resting against the overhanging loading bar 35, and the loading bar load restraining straps 22 are secured around the boat. The loading bar lock pin 44 is removed and the rear end of the boat is simultaneously lifted and rotated, as shown in Figure 5, so that it rests on the rear support bar 11. The limited play of the loading bar 35 in conjunction with its lower relation to the ground due to the downwardly extending support frame bars 24 and 25, and its resultant rotation in a plane tangential to the edge of the automobile top 21 give still greater ease in handling and loading the boat 45. The overhanging position of the loading bar 35 further protects the side of the automobile.

The carriage lock pin 41 is removed and the carriage 32 is moved back to central portion of the front support frame 12, thereby positioning the boat 45 directly above the automobile 18. The carriage lock pin 41 is inserted in the center lock pin holes 42 and the loading bar lock pin 44 is engaged. The load retaining straps 22 on the rear support bar 11 are secured over the rear end of the boat. The stabilizing straps 39 are passed through the stabilizing strap brackets 38 and slots 40 in the front cross bars 26. The boat 45 is now ready to be transported to the desired area. By reversing the above procedure, the boat is easily unloaded by one person.

Although the present embodiment of this invention has used a movable carriage provided with rollers or substantially frictionless bearings within the track created by the hollow front support members, the carriage is equally as operative when provided with means contained in the track so that the carriage is in a slidable relationship to said front support frame.

Various modifications of the invention may be made without departing from the principle thereof. Each of these modifications is to be considered as included in the hereinafter appended claims unless these claims by their language expressly provide otherwise.

Having thus set forth the nature of my invention, I claim the following:

1. A car top boat carrier comprising: front and rear support members; positioning elements electively positionable on a vehicle body surface and attached to said support members; a loading arm centrally pivotal on and slidably attached to the said front support member so as to transversely move across an automobile top; a lock selectively positioning said arm in restraint of sliding motion; a second lock selectively positioning said arm in restraint of swivel motion; restrainers associated with said front and rear members and said arm to secure a load to said supports and arm.

2. A car top boat carrier comprising: a rear support member; a front support frame having two parallel bars; suction cups attached to the ends of the front and rear support members; a carriage slidably attached to said parallel bars for transverse movement across an automobile top and having a centrally located vertical spindle; an arm attached pivotally to said spindle and selectively rotatable about said spindle; a pin for selectively locking said arm to said carriage; a second pin for selectively locking said carriage to said front support frame; load restraining straps associated with said rear support member and said arm; load stabilizing straps associated with said arm and said front support frame.

3. A car top boat carrier comprising: a rear support member; a front support frame having two spaced apart parallel bars curved downwardly at each end to follow the contour of a vehicle top; a cross bar near each end of said parallel bars fixedly joining said parallel bars in spaced apart relationship and provided with downwardly extending suction cups; a carriage provided with substantially frictionless bearings slidably attached to said parallel bars for transverse movement across an automobile top and having a centrally located upwardly extending vertical spindle; a loading arm centrally and pivotally attached to said spindle and selectively rotatable amout said spindle; a lock pin for selectively locking said loading arm to said carriage; a second pin for selectively locking said carriage to said front support member;

restrainers associated with said front and rear members and said arm to secure a load to said supports and arm.

4. A car top boat carrier comprising: a rear support member provided with a rear cross bar near each end; said rear cross bar having two downwardly extending suction cups; a separate front support frame having two spaced apart parallel hollow bars downwardly curved at each end to follow the contour of the vehicle top; front cross bars fixedly joining said parallel bars in spaced apart relationship and each provided with two downwardly extending suction cups; a carriage provided with substantially frictionless bearings slidably attached to said hollow parallel bars and having a centrally located upwardly extending vertical spindle; said frictionless bearings contained in movable relationship within said hollow parallel bars; a loading arm pivotally and centrally attached to said spindle and selectively rotatable about said spindle; a lock pin through said loading arm and carriage for selectively locking said loading arm to said carriage; a second lock pin through the said hollow parallel bars for selectively locking said carriage in relation to said hollow parallel bars.

5. A car top boat carrier comprising: a rear support member; a front support frame having two elongated, hollow spaced apart bars curved downwardly at each end to follow the contour of the vehicle top, said hollow bars provided with ways and access slots to said ways through the upper surface thereof; front cross bars near each end of said parallel bars fixedly joining said parallel bars in spaced apart relationship and provided with downwardly extending suction cups; a carriage provided with substantially frictionless bearings movable within each of the hollow parallel bars and having a centrally located spindle receiving hole; a loading arm provided with a centrally located downwardly disposed vertical spindle and selectively rotatable upon said spindle in relation to said carriage; a loading arm lock pin through said loading arm and carriage for selectively locking said loading arm to said carriage; a carriage restraining lock pin through the said parallel bars for selectively locking said carriage in relation to said parallel bars; load restraining straps attached to said rear support member; load restraining straps attachable to said loading arm; and load stabilizing straps associated with said loading arm and said front cross bars.

References Cited in the file of this patent

UNITED STATES PATENTS

| | | |
|---|---|---|
| 2,196,265 | Krogh | Apr. 9, 1940 |
| 2,600,082 | Sumner | June 10, 1952 |
| 2,667,295 | Johnston | Jan. 26, 1954 |
| 2,728,502 | Plantico | Dec. 27, 1955 |
| 2,765,180 | Albers | Oct. 2, 1956 |